(12) United States Patent
Ushio et al.

(10) Patent No.: US 7,781,560 B2
(45) Date of Patent: Aug. 24, 2010

(54) CURABLE ORGANOPOLYSILOXANE COMPOSITION

(75) Inventors: Yoshito Ushio, Chiba (JP); Osamu Mitani, Chiba (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 63 days.

(21) Appl. No.: 11/917,193

(22) PCT Filed: Jun. 9, 2006

(86) PCT No.: PCT/JP2006/312088

§ 371 (c)(1),
(2), (4) Date: Dec. 12, 2007

(87) PCT Pub. No.: WO2006/135036

PCT Pub. Date: Dec. 21, 2006

(65) Prior Publication Data

US 2009/0105441 A1    Apr. 23, 2009

(30) Foreign Application Priority Data

Jun. 15, 2005    (JP) .............................. 2005-174430

(51) Int. Cl.
*C08G 77/04*    (2006.01)
(52) U.S. Cl. ............................ 528/34; 528/15; 524/288
(58) Field of Classification Search .................. 528/34
See application file for complete search history.

(56) References Cited

U.S. PATENT DOCUMENTS

| | | | |
|---|---|---|---|
| 4,786,701 A | | 11/1988 | Tanaka |
| 5,625,022 A | * | 4/1997 | Onishi .......................... 528/15 |
| 5,973,030 A | * | 10/1999 | Matsushita et al. ........... 523/203 |
| 6,566,443 B2 | * | 5/2003 | Morimoto et al. ........... 524/588 |
| 2004/0181025 A1 | | 9/2004 | Schindler et al. |
| 2005/0101753 A1 | | 5/2005 | Schindler et al. |

FOREIGN PATENT DOCUMENTS

| | | |
|---|---|---|
| JP | 63030562 A | 2/1988 |
| JP | 4246466 A | 9/1992 |
| WO | WO 2006/001458 A2 | 1/2006 |
| WO | WO 2006/033375 A1 | 3/2006 |
| WO | WO 2006/040964 A1 | 4/2006 |
| WO | WO 2006/070903 A1 | 7/2006 |
| WO | WO 2006/104236 A1 | 10/2006 |

OTHER PUBLICATIONS

English language abstract for JP 4246466 extracted from espacenet. com database, dated Sep. 18, 2008.
English language abstract for JP 63030562 extracted from espacenet. com database, dated Sep. 18, 2008.
PCT International Search Report for PCT/JP2005/011864, dated Jan. 20, 2006, 11 pages.
PCT International Search Report for PCT/JP2005/024196, dated Mar. 20, 2006, 8 pages.
PCT International Search Report for PCT/JP2006/306996, dated Jul. 18, 2006, 8 pages.
PCT International Search Report for PCT/JP2005/018405, dated Mar. 22, 2006, 11 pages.
PCT International Search Report for PCT/JP2005/017443, dated Dec. 28, 2005, 10 pages.
PCT International Search Report for PCT/JP2006/312088, dated Sep. 22, 2006, 3 pages.

* cited by examiner

*Primary Examiner*—Ling-Siu Choi
*Assistant Examiner*—Chun-Cheng Wang
(74) *Attorney, Agent, or Firm*—Howard & Howard Attorneys PLLC

(57) ABSTRACT

A curable organopolysiloxane composition comprising: (A) an organopolysiloxane (a1) that contains in one molecule at least one silicon-bonded alkoxysilyl-containing group and an average of at least 0.5 alkenyl groups; or a mixture of said organopolysiloxane (a1) with an organopolysiloxane (a2) that contains in one molecule at least two alkenyl groups and that is free of the alkoxysilyl-containing groups; (B) an organopolysiloxane that contains in one molecule at least two silicon-bonded hydrogen atoms; (C) an organosilicon compound that contains in one molecule at least one silicon-bonded alkoxy group and that is free of the alkoxysilyl-containing groups; and (D) a hydrosilylation-reaction catalyst, has good adhesion to unclean aluminum die castings, PPS resins, etc., even when cured by heating at relatively low temperatures such as 100° C.

15 Claims, No Drawings

CURABLE ORGANOPOLYSILOXANE COMPOSITION

RELATED APPLICATIONS

This application claims priority to and all the advantages of International Patent Application No. PCT/JP2006/312088, filed on Jun. 9, 2006, which claims priority to Japanese Patent Application No. JP 2005-174430, filed on Jun. 15, 2005.

TECHNICAL FIELD

The present invention relates to a curable organopolysiloxane composition, and more specifically, to a curable organopolysiloxane composition that is cured by heating and, as a result of curing, demonstrates excellent adhesion to various substrates, even though with unclean surfaces.

BACKGROUND ART

Known among curable organopolysiloxane compositions, which are comprised an organopolysiloxane having in one molecule at least two silicon-bonded lower alkenyl groups, an organopolysiloxane having in one molecule at least two silicon-bonded hydrogen atoms, and a hydrosilylation-reaction catalyst, and which demonstrate excellent self-adhesion to various substrates as a result of curing, are curable organopolysiloxane compositions that contain an organosilicon compound having in one molecule a silicon-bond-unsaturated group and a silicon-bonded alkoxy group, an organosilicon compound having in one molecule a silicon-bonded hydrogen atom and a silicon-bonded alkoxy group, an organosilicon compound having in one molecule a silicon-bonded epoxy group and a silicon-bonded alkoxy group, or an aluminum compound, zirconium compound, titanium compound, or a similar adhesion-promotion agent (refer to Japanese Laid-Open (Unexamined) Patent Application Numbers Sho 63-30562 (30,562/1988) and Hei 4-246466 (246,466/1992)).

However, the aforementioned curable organopolysiloxane compositions demonstrate insufficient adhesion at low temperatures to substrates such as PPS resins and aluminum die castings with unclean surfaces.

It is an object of the present invention to provide a curable organopolysiloxane composition that shows good adhesion to substrates such as PPS resins and aluminum die castings with unclean surfaces, even at relatively low heating temperatures such as 100° C.

DISCLOSURE OF INVENTION

The curable organopolysiloxane composition of the present invention comprises:

(A) 100 parts by mass of an organopolysiloxane (a1) that contains in one molecule at least one silicon-bonded alkoxysilyl-containing group represented by the following general formula:

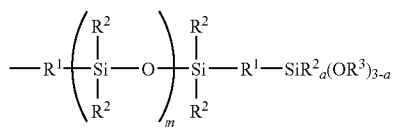

(where $R^1$s are the same or different bivalent organic groups, $R^2$s are the same or different univalent hydrocarbon groups which are free of aliphatic unsaturated bonds, $R^3$ is an alkyl group, "m" is an integer from 1 to 50, and "a" is an integer from 0 to 2) and an average of at least 0.5 alkenyl groups; or a mixture of said organopolysiloxane (a1) with an organopolysiloxane (a2) that contains in one molecule at least two alkenyl groups and that is free of the aforementioned alkoxysilyl-containing groups {the content of constituent (a1) in the mixture is in the range of 10 to 100 mass % (exclusive of 100 mass %)};

(B) an organopolysiloxane that contains in one molecule at least two silicon-bonded hydrogen atoms {wherein the amount of silicon-bonded hydrogen atoms of this component is in the range of 0.3 to 20 per 1 alkenyl group of component (A)};

(C) an organosilicon compound that contains in one molecule at least one silicon-bonded alkoxy group and that is free of the aforementioned alkoxysilyl-containing groups {the content of this component is in the range of 0.01 to 20 parts by mass per 100 parts by mass of the sum of components (A) and (B)}; and (D) a catalytic quantity of a hydrosilylation-reaction catalyst.

EFFECTS OF INVENTION

The curable organopolysiloxane composition of the present invention is characterized by good adhesion to substrates such as PPS resins and aluminum die castings with unclean surfaces, even at relatively low heating temperatures such as 100° C.

DETAILED DESCRIPTION OF THE INVENTION

Constituent (a1), which is used in the composition of the invention for imparting the property of excellent adhesion at low temperatures, is an organopolysiloxane that contains in one molecule at least one silicon-bonded alkoxysilyl-containing group represented by the following general formula:

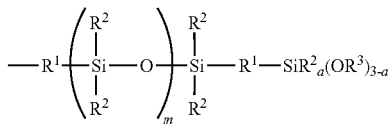

and an average of at least 0.5 alkenyl groups. In the above formula, $R^1$s are the same or different bivalent organic groups such as ethylene, propylene, butylene, pentylene, hexylene, heptylene, octylene, or similar alkylenes; ethyleneoxyethylene, propyleneoxyethylene, propyleneoxypropylene, or similar alkyleneoxyalkylenes. Most preferable of these are alkylene groups and, in particular, ethylene groups. Furthermore, in the above formula, $R^2$s are the same or different univalent hydrocarbon groups which are free of aliphatic, unsaturated bonds. The groups can be exemplified by methyl, ethyl, propyl, butyl, pentyl, hexyl, heptyl, octyl, nonyl, decyl, octadecyl, or similar alkyl groups; cyclopentyl, cyclohexyl, or similar cycloalkyl groups; phenyl, tolyl, xylyl, naphthyl, or similar aryl groups; benzyl, phenethyl, phenylpropyl, or similar aralkyl groups; 3-chloropropyl, 3,3,3-trifluoropropyl groups, or similar halogenated alkyl groups; most preferable of the above are alkyl and aryl groups, and, in particular, methyl and phenyl groups. In the above formula, $R^3$ designates an alkyl group such as methyl, ethyl, propyl, butyl, pentyl, and hexyl groups, of which methyl groups are preferable. Furthermore, in the above formula, "m" is an integer between 1 and 50, preferably between 1 and 10, and most preferably between 1 and 5. In the above formula, "a" is an integer between 0 and 2, where 0 is preferable. The aforementioned alkoxysilyl-containing group is represented by the following formulas:

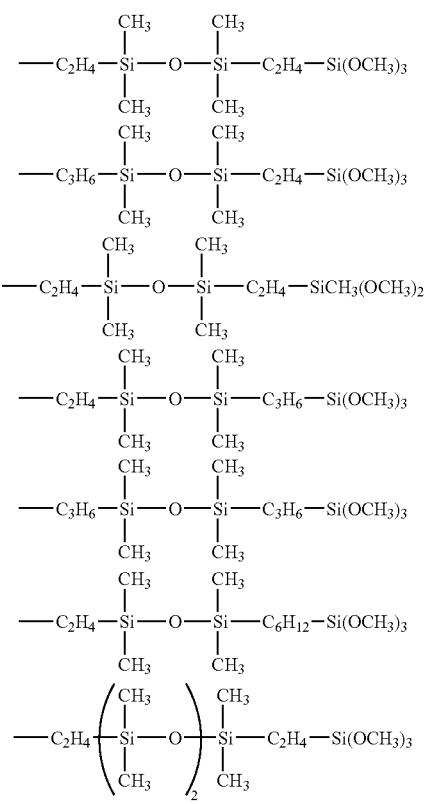

Furthermore, alkenyl groups of constituent (a1) can be exemplified by vinyl, allyl, butenyl, pentenyl, and hexenyl groups, of which vinyl groups are preferable. Other silicon-bonded organic groups of constituent (a1) may be represented by the same univalent hydrocarbon groups as those designated above by $R^2$, such as alkyl, cycloalkyl, aryl, aralkyl, halogenated alkyl, or similar univalent hydrocarbon groups that are free of aliphatic unsaturated bonds. Of these, most preferable are alkyl and aryl groups, in particular, methyl and phenyl groups.

Constituent (a1) should contain in one molecule at least one of the aforementioned alkoxysilyl-containing groups. However, in order to demonstrate higher adhesion, this constituent should contain at least two of the aforementioned groups in one molecule. There are no special restrictions with regard to the upper limit for the number of alkoxysilyl-containing groups in one molecule, but it is recommended that the number of alkenyl groups does not exceed 20. If the number of the alkoxysilyl-containing groups in one molecule exceeds 20, this will not significantly improve the adhesive properties. Also, there are no special restrictions with regard to the bonding position of the alkoxysilyl-containing groups, and these groups can be located at the molecular terminals as well as in side chains. Furthermore, constituent (a1) should contain in one molecule an average of at least 0.5 alkenyl groups. If the average content of the alkenyl groups in one molecule is less than 0.5, the composition will be either insufficiently cured, or a cured body obtained by curing the composition will have low physical properties. There are no special restrictions with regard to the upper limit for the number of alkenyl groups in one molecule, but it is recommended that the number of alkenyl groups does not exceed 20. If the number of alkenyl groups in one molecule exceeds 20, this will not significantly improve adhesive and physical characteristics of the composition. Similarly, there are no special restrictions with regard to the bonding position of the alkenyl groups, and the latter can be located on the molecular terminals as well as in the side chains.

There are no special restrictions with regard to the molecular structure of constituent (a1), and this constituent may have a linear, branched, net-like, or dendritic molecular structure. Constituent (a1) may comprise a mixture of organopolysiloxanes having the aforementioned molecular structures. In particular, it is recommended that constituent (a1) is a linear-structured organopolysiloxane having the aforementioned alkoxysilyl-containing groups bonded to silicon atoms at both molecular terminals and side molecular chains. There are no special restrictions with regard to the viscosity of constituent (a1) at 25° C., but it is recommended that the viscosity is not less than 20 mPa·s and preferably is in the range of 100 to 1,000,000 mPa·s. If the viscosity is below the recommended range, a cured body obtained by curing the composition will have impaired physical characteristics, especially low softness and elongation.

The aforementioned constituent (a1) is exemplified by the following organopolysiloxanes:

an organopolysiloxane of the following average formula:

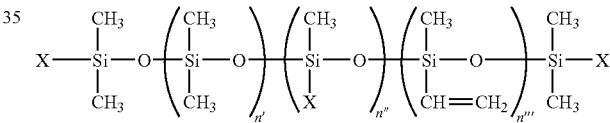

an organopolysiloxane of the following average formula:

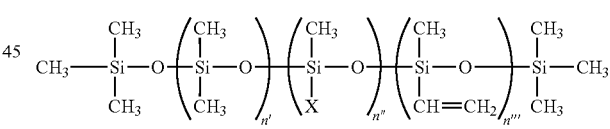

an organopolysiloxane of the following average formula:

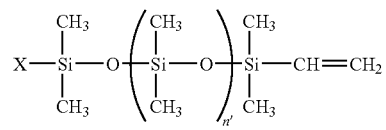

and an organopolysiloxane of the following average unit formula:

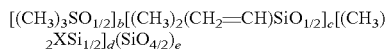

$[(CH_3)_3SiO_{1/2}]_b[(CH_3)_2(CH_2=CH)SiO_{1/2}]_c[(CH_3)_2XSiO_{1/2}]_d(SiO_{4/2})_e$

In the above formulas, X represents alkoxysilyl-containing groups of the aforementioned examples; n', n", and n'" are integers equal to or greater than 1; and "b", "c", "d", and "e" are positive numbers.

Aforementioned constituent (a1) is prepared by subjecting an alkenyl-containing organopolysiloxane and a siloxane that contains an alkoxysilyl group represented by the following formula:

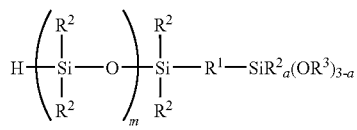

And used in a less-than-equivalent amount relative to the aforementioned alkenyl groups to a hydrosilylation reaction in the presence of a hydrosilylation-reaction catalyst. In the above formula, $R^1$, $R^2$, $R^3$, "m", and "a" are the same as defined above.

Constituent (a2), which is an arbitrary constituent to assist curing of the composition if the use of constituent (a1) alone does not provide sufficient curing, is an organopolysiloxane that contains in one molecule at least two alkenyl groups and that is free of the aforementioned alkoxysilyl-containing groups. Alkenyl groups contained in constituent (a2) are exemplified by vinyl, allyl, butenyl, pentenyl, and hexenyl groups, of which vinyl groups are preferable. There are no restrictions with regard to the bonding positions of the aforementioned alkenyl groups, and they may be located on molecular terminals or in side chains. Silicon-bonded organic groups other than alkenyl groups of constituent (a2) are the same as those designated above by $R^2$ and may be represented by alkyl, cycloalkyl, aryl, aralkyl, halogenated alkyl, or other univalent hydrocarbon groups which are free of aliphatic unsaturated bonds. Most preferable of the above are alkyl and aryl groups, especially methyl and phenyl groups. There are no special restrictions with regard to the molecular structure of constituent (a2), and this constituent may have a linear, partially branched linear, branched, cyclic, net-like, or dendritic molecular structure. Constituent (a2) may comprise a mixture of two or more of those exemplified above having the above-described molecular structure and, in particular, it is recommended that constituent (a2) has a linear structure. There are no special restrictions with regard to the viscosity of constituent (a2) at 25° C., but it is recommended that the viscosity be in the range of 20 to 1,000,000 mPa·s, and preferably 100 to 100,000 mPa·s. If the viscosity is below the recommended range, a cured body obtained by curing the composition will have impaired physical characteristics, especially because of low softness and elongation properties. On the other hand, if the viscosity exceeds the upper recommended limit, the composition will become too viscous and will be difficult to handle during processing.

The following are specific examples of constituent (a2): a copolymer of methylvinylsiloxane and dimethylsiloxane capped at both molecular terminals with trimethylsiloxy groups; a copolymer of methylphenylsiloxane, methylvinylsiloxane, and dimethylsiloxane capped at both molecular terminals with trimethylsiloxy groups; a dimethylpolysiloxane capped at both molecular terminals with dimethylvinylsiloxy groups; a methylphenylpolysiloxane capped at both molecular terminals with dimethylvinylsiloxy groups; a copolymer of methylvinylsiloxane and dimethylsiloxane capped at both molecular terminals with dimethylvinylsiloxy groups; a copolymer of methylvinylsiloxane and dimethylsiloxane capped at both molecular terminals with dimethylphenylsiloxy groups; and a dimethylpolysiloxane capped at both molecular terminals with methylvinylphenylsiloxy groups.

Since constituent (a2) is an arbitrary one that is used to assist curing of the composition when the use of constituent (a1), alone, is insufficient, constituent (a2) can be used in arbitrary quantities, but when constituent (a2) is used jointly with constituent (a1), it is recommended to add constituent (a2) in an amount of 0 to 90 mass % (except for 0 mass %) per total mixture of constituents (a1) and (a2), i.e., constituent (a1) should be in the range of 10 to 100 mass % (except for 100 mass %).

Component (B), which is a cross-linking agent of the present composition, is an organopolysiloxane that contains in one molecule at least two silicon-bonded hydrogen atoms. Silicon-bonded organic groups of component (B) are represented by the same groups as those defined above for $R^2$, i.e., alkyl, cycloalkyl, aryl, aralkyl, halogenated alkyl, or similar univalent hydrocarbon groups that are free of aliphatic unsaturated bonds. Of these, most preferable are alkyl and aryl groups, in particular, methyl and phenyl groups. There are no special restrictions with regard to the molecular structure of component (B), and this component may have a linear, partially branched linear, branched, cyclic, net-like, or dendritic molecular structure, of which the linear structure is preferable. There are no special restrictions with regard to the viscosity of component (B) at 25° C., but it is recommended that the viscosity be in the range of 1 to 10,000 mPa·s.

The following are specific examples of component (B): a methylhydrogenpolysiloxane capped at both molecular terminals with trimethylsiloxy groups; a copolymer of methylhydrogensiloxane and dimethylsiloxane capped at both molecular terminals with trimethylsiloxy groups; a copolymer of methylhydrogensiloxane and dimethylsiloxane capped at both molecular terminals with dimethylhydrogensiloxy groups; or mixture of the above compounds in an amount of two or more.

Component (B) can be used in such an amount that the content of silicon-bonded hydrogen atoms of this component is in the range of 0.3 to 20 per one alkenyl group of component (A). If component (B) is used in an amount less than the lower recommended range, the obtained composition will not be sufficiently curable, and if, on the other hand, the added amount of component (B) exceeds the upper recommended limit, either the obtained composition will release hydrogen during the curing stage, or a cured body obtained by curing the composition will have extremely low thermal resistance. In general, in order to overcome the above-stated problems, it is recommended to add component (B) in an amount of 0.5 to 50 parts by mass per 100 parts by mass of component (A).

Component (C) is one that, when coexisting with constituent (a1), imparts to a cured body obtained from the present composition a property of excellent low-temperature adhesion to substrates with unclean surfaces. This component comprises an organosilicon compound that contains in one molecule at least one silicon-bonded alkoxy group and is free of the aforementioned alkoxysilyl-containing groups. The aforementioned component (C) is a known adhesion promoter that can be compounded with hydrosilylation-curable organopolysiloxane compositions. Specific examples of component (C) are the following: tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, 3-glycidoxypropyltrimethoxysilane, 2-(3,4-epoxycyclohexyl)-ethyltrimethoxysilane, 4-oxiranylbutyltrimethoxysilane, 3-methacryloxypropyltrimethoxysilane, N-phenyl-3-aminopropyltrimethoxysilane, or similar alkoxysilane compounds;

silatrane derivatives that contain at least one silicon-bonded alkoxy group and at least one alkenyl group in one molecule of silatrane derivatives such as the one represented by the following formula:

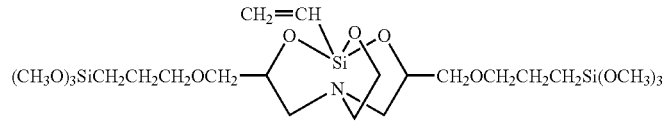

siloxane compounds that contain in one molecule at least one silicon-bonded alkenyl group or at least one silicon-bonded hydrogen atom and at least one silicon-bonded alkoxy group, a mixture of a silane or siloxane compound that contains at least one silicon-bonded alkoxy group and a siloxane compound that contains in one molecule at least one silicon-bonded hydroxy group and at least one silicon-bonded alkenyl group; siloxane compounds represented by the following average unit formula:

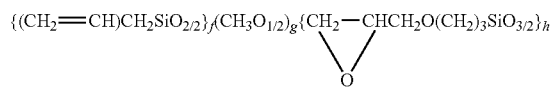

(where "f", "g", and "h" are positive numbers); siloxane compounds represented by the following average unit formula:

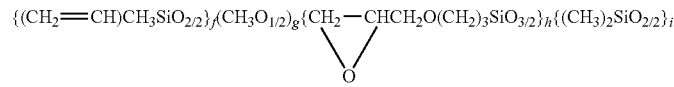

(where "f", "g", "h", and "i" are positive numbers); or mixtures of the above compounds in the amount of two or more.

There are no special restrictions with regard to the amounts of component (C) provided that the amounts are sufficient for imparting adhesive properties to the cured body of the composition. In general, however, it is recommended to add this component in an amount of 0.01 to 20 parts by mass, preferably 0.1 to 10 parts by mass per 100 parts by mass of the sum of components (A) and (B). If component (C) is added in an amount less than the lower recommended limit, this will reduce adhesive properties of the obtained cured body. If, on the other hand, the added amount exceeds the upper recommended limit, one cannot expect a significant improvement in adhesive properties.

The hydrosilylation-reaction catalyst of component (D) is used for promoting a hydrosilylation reaction by which the composition is cured. The aforementioned component (D) can be exemplified by platinum black, platinum on active carbon, platinum on fine silica powder, chloroplatinic acid, alcohol solutions of chloroplatinic acid, platinum-olefin complexes, platinum-vinylsiloxane complexes, or similar platinum-type catalysts; tetrakis (triphenylphosphine) palladium, or similar palladium-type catalysts; and rhodium-type catalysts. Most preferable are platinum-type hydrosilylation-reaction catalysts.

Component (D) should be used in a catalytic quantity. No special restrictions exist in this regard, but it is recommended to use this component in an amount of 0.1 to 1,000 parts by mass, preferably 0.5 to 200 parts by mass of the catalytic metal contained in component (D) per $10^6$ parts by mass of the sum of components (A) and (B).

The composition of the invention is prepared by uniformly mixing aforementioned components (A) through (D). In order to improve storage stability and handleability of the present composition, it can incorporate some arbitrary components such as: 2-methyl-3-butyn-2-ol, 3,5-dimethyl-1-hexyn-3-ol, 2-phenyl-3-butyn-2-ol, or similar acetylene-type compounds; 3-methyl-3-penten-1-yne, 3,5-dimethyl-3-hexen-1-yne, or similar en-yne compounds; 1,3,5,7-tetramethyl-1,3,5,7-tetravinylcyclotetrasiloxane, 1,3,5,7-tetramethyl-1,3,5,7-tetrahexenylcyclotetrasiloxane; benzotriazole, or similar triazoles, phosphines, mercaptanes, hydrazines, or other curing inhibitors. The amounts in which the aforementioned curing inhibitors are used are selected with reference to specific curing conditions, but, in general, it is recommended to add them in an amount of 0.001 to 5 parts by mass per 100 parts by mass of the sum of components (A) and (B).

If necessary, the composition of the present invention may be combined with other arbitrary components such as fine dry-process silica powder, fine wet-process silica powder, fine quartz powder, fine calcium carbonate powder, fine titanium dioxide powder, diatomaceous earth, fine aluminum oxide powder, fine aluminum hydroxide powder, fine zinc oxide powder, fine zinc carbonate powder, or similar inorganic fillers, as well as the aforementioned inorganic fillers surface-treated with methyltrimethoxysilanes or similar organoalkoxysilanes, trimethylchlorosilanes, or similar organohalosilanes, hexamethyldisilazanes, or similar organosilazanes, α,ω-silanol groups-capped dimethylsiloxane oligomers, α,ω-silanol groups-capped methylphenylsiloxane oligomers, α,ω-silanol groups-capped methylvinylsiloxane oligomers, or similar siloxane oligomers. Furthermore, within the limits that are not contradictory to the objects of the present invention, the present composition can be combined with other arbitrary components such as toluene, xylene, acetone, methylethylketone, methylisobutylketone, hexane, heptane, or similar organic solvents; α,ω-trimethylsiloxy groups-capped dimethylpolysiloxane, α,ω-trimethylsiloxy groups-capped methylphenylpolysiloxane, or similar non-crosslinkable diorganopolysiloxanes; aluminum compounds, zirconium compounds, titanium compounds, or similar adhesion-promotion catalysts; carbon black or similar flame retardants; iron oxide or similar heat-resistant agents; dialkylsiloxane oligomers capped at both molecular terminals with hydroxydialkylsiloxane groups, or similar plasticizers; as well as pigments, thixotropic agents, rust-resistant agents, etc.

EXAMPLES

The curable organopolysiloxane composition of the present invention will be further described in more detail with reference to Practical and Comparative Examples. The values of viscosities used in the examples were measured at 25° C.

Reference Example 1

A mixture was prepared by uniformly mixing at room temperature 100 parts by mass of a copolymer of methylvinylsiloxane and dimethylsiloxane having a viscosity of 4,000 mPa·s and represented by the following average formula:

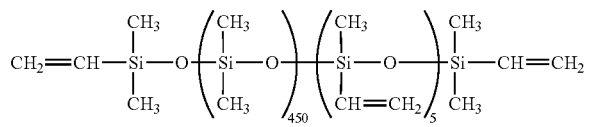

and 5.0 parts by mass of 1-trimethoxysilylethyl-1,1,3,3-tetramethyldisiloxane of the following formula:

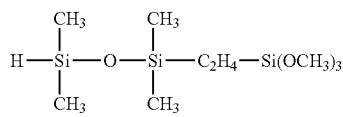

(with 6 silicon-bonded hydrogen atoms per 7 vinyl groups in the aforementioned copolymer of dimethylsiloxane and methylvinylsiloxane). The mixture was then combined with a complex of platinum and 1,3-divinyl-1,1,3,3-tetramethyldisiloxane (where in terms of mass units, 3 ppm of metal platinum were used per mass of the aforementioned mixture). The components were mixed in a vacuum with heat for 1 hr. at 100° C., whereby an organopolysiloxane (having the content of vinyl groups equal to 0.08 mass %) was obtained and was represented by the average formula given below.

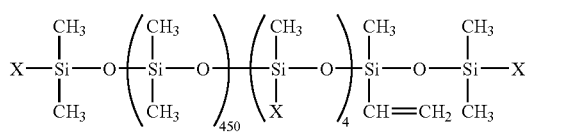

where X is represented by the following formula:

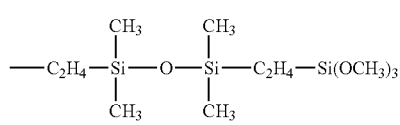

Reference Example 2

A mixture was prepared by uniformly mixing at room temperature 100 parts by mass of a copolymer of methylvinylsiloxane and dimethylsiloxane having a viscosity of 4,000 mPa·s and represented by the following average formula:

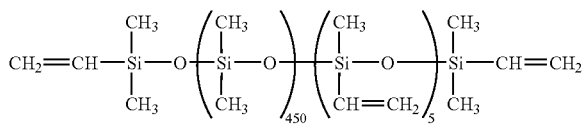

and 4.2 parts by mass of 1-trimethoxysilylethyl-1,1,3,3-tetramethyldisiloxane of the following formula.

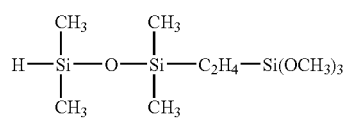

(with 5 silicon-bonded hydrogen atoms per 7 vinyl groups in the aforementioned copolymer of dimethylsiloxane and methylvinylsiloxane). The mixture was then combined with a complex of platinum and 1,3-divinyl-1,1,3,3-tetramethyldisiloxane (where in terms of mass units, 3 ppm of metal platinum were used per mass of the aforementioned mixture). The components were mixed in a vacuum with heat for 1 hr. at 100° C., whereby an organopolysiloxane (having the content of vinyl groups equal to 0.15 mass %) was obtained and was represented by the average formula given below.

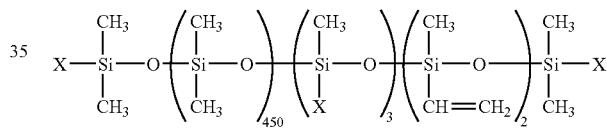

where X is represented by the following formula:

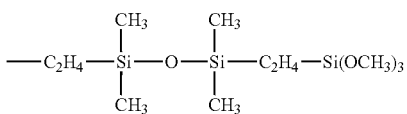

Reference Example 3

A mixture was prepared by uniformly mixing at room temperature for 1 hr. 41 parts by mass of dimethylpolysiloxane (the content of vinyl groups was 0.08 mass %) having a viscosity of 40,000 mPa·s and represented by the following average formula:

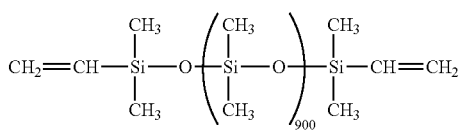

and 18 parts by mass of a dry-process silica surface-treated with hexamethyldisilazane and having a BET-specific surface area of 200 m²/g. The mixture was then further mixed with heat in a vacuum for 2 hr. at 70° C., whereby a pasty compound having a viscosity of 1,200,000 mPa·s was prepared.

Practical Example 1

A curable organopolysiloxane composition was prepared by uniformly mixing the following components: 59 parts by mass of the organopolysiloxane prepared in Reference Example 1; 59 parts by mass of the pasty compound prepared in Reference Example 3; 1.1 parts by mass of the methylhydrogenpolysiloxane capped at both molecular terminals with trimethylsiloxy groups and having a viscosity of 20 mPa·s (the amount of silicon-bonded hydrogen atoms was 1.6 mass %) (5.9 silicon-bonded hydrogen atoms were contained in this component per one vinyl group of all vinyl groups contained in the organopolysiloxane prepared in Reference Example 1 and vinyl groups contained in the dimethylpolysiloxane in the pasty compound prepared in Reference Example 3); 1 part by mass of 3-glycidoxypropyltrimethoxysilane; a complex of platinum and 1,3-divinyl-1,1,3,3-tetramethyldisiloxane (where in mass units 10 ppm of metal platinum were used per total mass of the organopolysiloxane components of the present composition); and 0.1 part by mass of 2-phenyl-3-butyn-2-ol.

Following this, the obtained curable organopolysiloxane composition was placed between two unclean aluminum diecasting plates or unclean PPS plates, and the plates were squeezed until the thickness of the composition between the plates was equal to 1 mm. The composition was then cured to form silicone rubber by heating each unit in a hot-air-circulation oven for 60 min. at 100° C. As a result, adhesion test specimens were obtained. The specimens were tested with regard to tensile shear bond strength according to JIS K 6850: 1999 ("Method of Testing Tensile Shear Bond Strength Between Adhesive Agent and Rigid Substrate"). Furthermore, the adhesion interface was visually observed for evaluating the percentage of cohesive failure (percentage of the silicone rubber with cohesive failure per total bonded area). Results of the test are shown in Table 1.

A silicone rubber sheet was produced by compressing the aforementioned curable organopolysiloxane composition in a 10-mm-thick mold for 60 min. with heating at 100° C. Hardness (type-A durometer hardness) of the obtained silicone rubber was measured in accordance with JIS K 6253-1997 ("Method for Testing Hardness of Vulcanized Rubber and Thermoplastic Rubber"). Results of the test are shown in Table 1.

Practical Example 2

A curable organopolysiloxane composition was prepared by uniformly mixing the following components: 59 parts by mass of the organopolysiloxane prepared in Reference Example 2; 59 parts by mass of the pasty compound prepared in Reference Example 3; 1.3 parts by mass of the methylhydrogenpolysiloxane capped at both molecular terminals with trimethylsiloxy groups and having a viscosity of 20 mPa·s (the amount of silicon-bonded hydrogen atoms was 1.6 mass %) (4.6 silicon-bonded hydrogen atoms were contained in this component per one vinyl group of the sum of all vinyl groups contained in the organopolysiloxane prepared in Reference Example 2 and vinyl groups contained in the dimethylpolysiloxane in the pasty compound prepared in Reference Example 3); 1 part by mass of a silatrane derivative represented by the following formula:

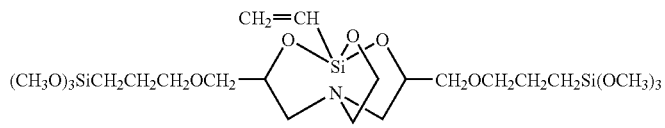

a complex of platinum and 1,3-divinyl-1,1,3,3-tetramethyldisiloxane (where in mass units, 10 ppm of metal platinum were used per total mass of the organopolysiloxane components of the present composition); and 0.1 part by mass of 2-phenyl-3-butyn-2-ol. Similar to Practical Example 1, the obtained composition was tested with regard to tensile shear bond strength, cohesive failure, and type-A durometer hardness. Results of the test are shown in Table 1.

Comparative Example 1

A curable organopolysiloxane composition was prepared in the same manner as in Practical Example 1 except for the fact that a dimethylpolysiloxane (the content of vinyl groups was equal to 0.08 mass %) having a viscosity of 40,000 mPa·s and represented by the following average formula:

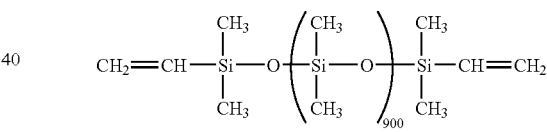

was used instead of the organopolysiloxane of Reference Example 1. Similar to Practical Example 1, the obtained composition was tested with regard to tensile shear bond strength, cohesive failure, and type-A durometer hardness. Results of the test are shown in Table 1.

Comparative Example 2

A curable organopolysiloxane composition was prepared in the same manner as in Practical Example 2 except for the fact that in Practical Example 2 a dimethylpolysiloxane (the content of vinyl groups was equal to 0.12 mass %) having a viscosity of 9,400 mPa·s and represented by the following average formula:

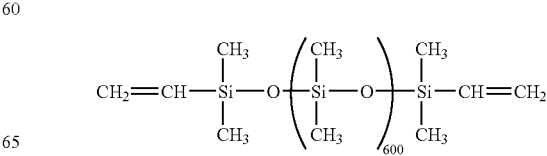

was used instead of the organopolysiloxane of Reference Example 2 (the amount of silicon-bonded hydrogen atoms of the methylhydrogenpolysiloxane was 5.3 per one vinyl group of total of the sum of all vinyl groups contained in the dimethylpolysiloxane in the pasty compound prepared in Reference Example 3 and vinyl groups of the aforementioned dimethylpolysiloxane). Similar to Practical Example 1, the obtained composition was tested with regard to tensile shear bond strength, cohesive failure, and type-A durometer hardness. Results of the test are shown in Table 1.

TABLE 1

|  |  | Examples | | | |
| --- | --- | --- | --- | --- | --- |
|  |  | Practical Examples | | Comparative Examples | |
| Properties | | 1 | 2 | 1 | 2 |
| Adhesive Strength (N/cm²) | Unclean aluminum die casting | 160 | 170 | 80 | 50 |
|  | Unclean PPS | 160 | 170 | 30 | 10 |
| Cohesive Failure (%) | Unclean aluminum die casting | 100 | 100 | 30 | 10 |
|  | Unclean PPS | 100 | 100 | 10 | 0 |
| Type-A Durometer Hardness | | 20 | 30 | 25 | 35 |

INDUSTRIAL APPLICABILITY

The curable organopolysiloxane composition of the present invention which is curable by heating and turned into silicone gel, low-hardness silicone rubber, or high-hardness silicone rubber, demonstrates excellent adhesion to various unclean substrates with bonding as a result of curing. In particular, since this composition demonstrates good adhesion to unclean aluminum die castings, PPS resins, etc., even when cured by heating at relatively low temperatures such as 100° C., the composition may find application as an adhesive agent or sealant in electrical and electronic devices used in vehicles.

The invention claimed is:

1. A curable organopolysiloxane composition comprising:
(A) 100 parts by mass of an organopolysiloxane (a1) that contains in one molecule at least one silicon-bonded alkoxysilyl-containing group represented by the following general formula:

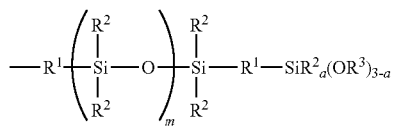

where $R^1$s are the same or different bivalent organic groups, $R^2$s are the same or different univalent hydrocarbon groups which are free of aliphatic unsaturated bonds, $R^3$ is an alkyl group, "m" is an integer from 1 to 50, and "a" is an integer from 0 to 2 and an average of at least 0.5 alkenyl groups; or a mixture of said organopolysiloxane (a1) with an organopolysiloxane (a2) that contains in one molecule at least two alkenyl groups and that is free of the aforementioned alkoxysilyl-containing groups wherein the content of constituent (a1) in the mixture is in the range of 10 to 100 mass % (exclusive of 100 mass %);

(B) an organopolysiloxane that contains in one molecule at least two silicon-bonded hydrogen atoms wherein the amount of silicon-bonded hydrogen atoms of this component is in the range of 0.3 to 20 per 1 alkenyl group of component (A);

(C) an organosilicon compound that contains in one molecule at least one silicon-bonded alkoxy group and that is free of the aforementioned alkoxysilyl-containing groups wherein the content of this component is in the range of 0.01 to 20 parts by mass per 100 parts by mass of the sum of components (A) and (B); and (D) a catalytic quantity of a hydrosilylation-reaction catalyst.

2. The curable organopolysiloxane composition of claim 1, wherein said constituent (a1) is a linear-chain organopolysiloxane that contains the aforementioned alkoxysilyl-containing groups bonded to silicon atoms at both molecular terminals and at a molecular side chain.

3. The curable organopolysiloxane composition according to claim 1, wherein the alkoxysilyl-containing group of constituent (a1) is represented by the following formula:

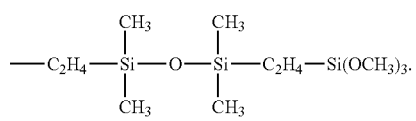

4. The curable organopolysiloxane composition according to claim 2, wherein the alkoxysilyl-containing group of constituent (a1) is represented by the following formula:

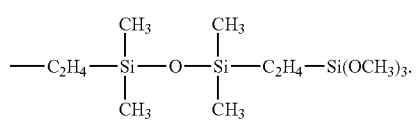

5. The curable organopolysiloxane composition according to claim 1, wherein the hydrosilylation-reaction catalyst is selected from the group of platinum catalysts, palladium catalysts, and rhodium catalysts.

6. The curable organopolysiloxane composition according to claim 5, wherein the content of component (D) is in the range of 0.1 to 1,000 parts by mass of the catalytic metal contained in component (D) per $10^6$ parts by mass of the sum of components (A) and (B).

7. The curable organopolysiloxane composition according to claim 1, wherein the hydrosilylation-reaction catalyst is a platinum catalyst.

8. The curable organopolysiloxane composition according to claim 7, wherein the platinum catalyst is selected from the group of platinum black, platinum on active carbon, platinum on fine silica powder, chloroplatinic acid, alcohol solutions of chloroplatinic acid, platinum-olefin complexes, and platinum-vinylsiloxane complexes.

9. The curable organopolysiloxane composition according to claim 1, wherein each $R^1$ is an alkylene group, each $R^2$ is an alkyl group or an aryl group, and each $R^3$ is an alkyl group.

10. The curable organopolysiloxane composition according to claim 9, wherein each $R^1$ is an ethylene group, each $R^2$ is a methyl group or a phenyl group, and each $R^3$ is a methyl group.

11. The curable organopolysiloxane composition according to claim 1, wherein "m" of constituent (a1) is an integer from 1 to 10, and "a" of constituent (a1) is 0.

12. The curable organopolysiloxane composition according to claim 1, wherein constituent (a1) contains in one molecule at least two silicon-bonded alkoxysilyl-containing groups represented by the general formula.

13. The curable organopolysiloxane composition according to claim 1, wherein the alkenyl groups of constituent (a2) are vinyl groups.

14. The curable organopolysiloxane composition according to claim 1, wherein constituent (a2) is selected from the group of a copolymer of methylvinylsiloxane and dimethylsiloxane capped at both molecular terminals with trimethylsiloxy groups; a copolymer of methylphenylsiloxane, methylvinylsiloxane, and dimethylsiloxane capped at both molecular terminals with trimethylsiloxy groups; a dimethylpolysiloxane capped at both molecular terminals with dimethylvinylsiloxy groups; a methylphenylpolysiloxane capped at both molecular terminals with dimethylvinylsiloxy groups; a copolymer of methylvinylsiloxane and dimethylsiloxane capped at both molecular terminals with dimethylvinylsiloxy groups; a copolymer of methylvinylsiloxane and dimethylsiloxane capped at both molecular terminals with dimethylphenylsiloxy groups; and a dimethylpolysiloxane capped at both molecular terminals with methylvinylphenylsiloxy groups.

15. The curable organopolysiloxane composition according to claim 1, wherein component (B) is selected from the group of a methylhydrogenpolysiloxane capped at both molecular terminals with trimethylsiloxy groups; a copolymer of methylhydrogensiloxane and dimethylsiloxane capped at both molecular terminals with trimethylsiloxy groups; a copolymer of methylhydrogensiloxane and dimethylsiloxane capped at both molecular terminals with dimethylhydrogensiloxy groups; and mixtures thereof.

\* \* \* \* \*